United States Patent

[11] 3,589,451

| [72] | Inventors | Philip D. Wenzel<br>Rockford;<br>Gerald L. Gallagher, Love Park, both of, Ill. |
|---|---|---|
| [21] | Appl. No. | 763,108 |
| [22] | Filed | Sept. 27, 1968 |
| [45] | Patented | June 29, 1971 |
| [73] | Assignee | J. I. Case Company |

[54] HITCH MECHANISM
6 Claims, 5 Drawing Figs.

[52] U.S. Cl. .................................................. 172/285,
172/605, 172/679, 280/456
[51] Int. Cl. ................................................. A01b 69/00,
A01b 59/42
[50] Field of Search.......................................... 172/785,
784, 783, 605, 677, 741, 744, 763, 446, 448, 679,
680; 280/456, 495

[56] References Cited
UNITED STATES PATENTS

| 1,547,778 | 7/1925 | Barker............................ | 172/285 X |
| 2,815,591 | 12/1957 | Mattingly ....................... | 172/446 X |
| 3,158,205 | 11/1964 | Frager et al.................... | 172/285 |
| 3,239,168 | 3/1966 | Wiemann et al.............. | 280/456 X |
| 2,322,342 | 6/1943 | Bunn............................. | 172/285 X |

*Primary Examiner*—Robert E. Pulfrey
*Assistant Examiner*—Stephen C. Pellegrino
*Attorney*—Dressler, Goldsmith, Clement & Gordon ABSTRACT: A hitch mechanism for connecting a tillage implement, or the like, to a tractive vehicle, such as a tractor, with the hitch mechanism including means responsive to turning movement of the tractor for steering a tail wheel at the rearward end of the implement. The hitch mechanism is of the "in-furrow" type and includes lateral adjustment means whereby the first plow bottom can be accurately positioned relative to the inside of the outer tractor wheel.

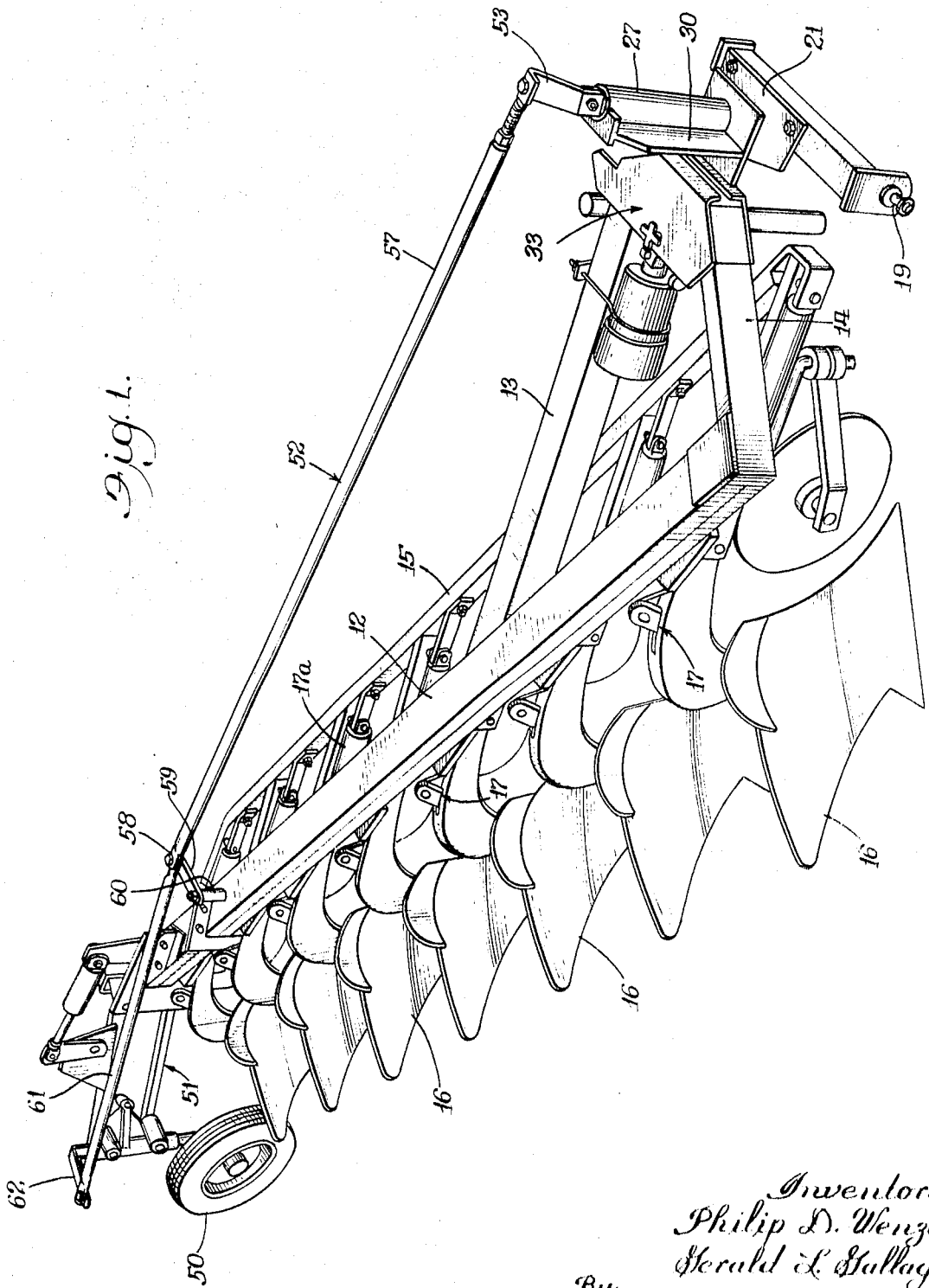

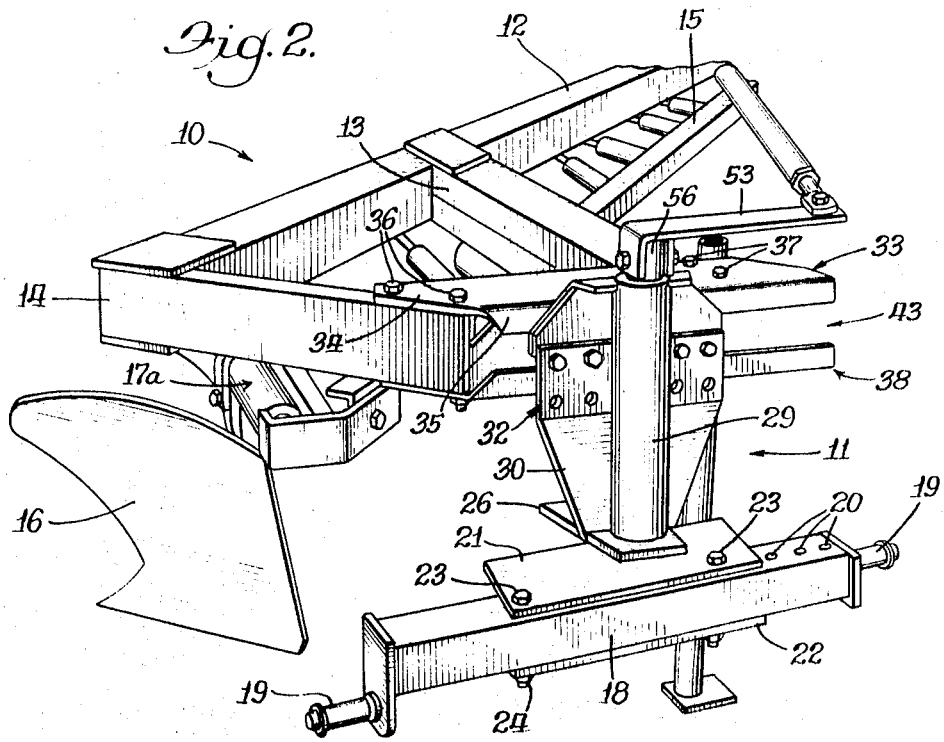
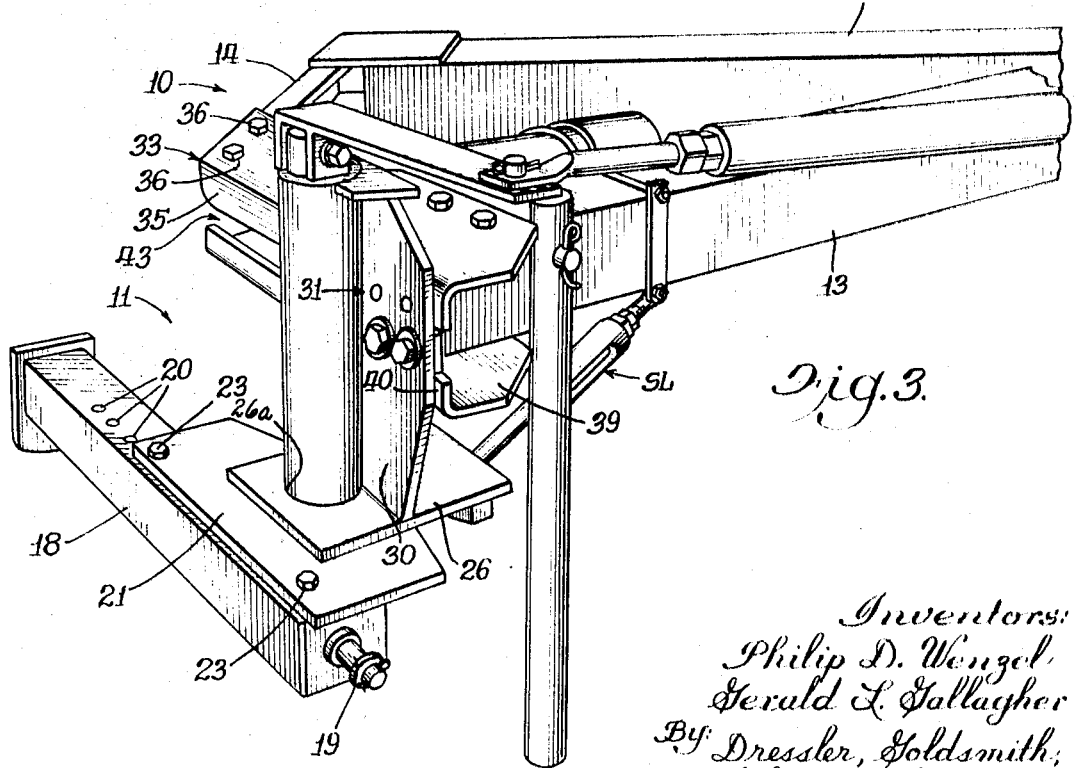

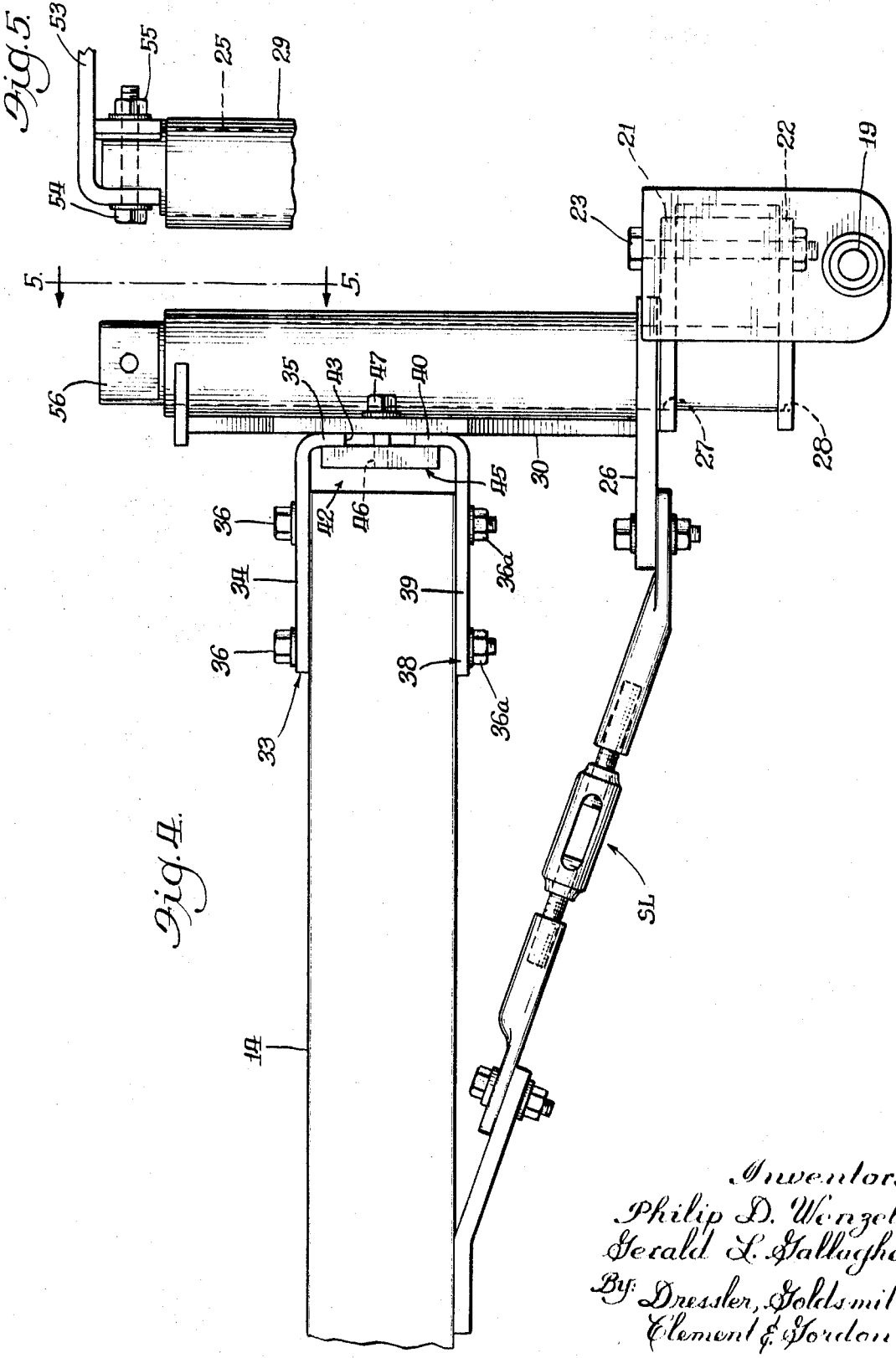

3,589,451

HITCH MECHANISM

BACKGROUND OF THE INVENTION

In the past, semimounted implements have been connected to tractive vehicles by "on-land" or "in-furrow" hitches. In-furrow hitches have the advantage of placing the first plow bottom in alignment with the inside of the outer tractor wheel, so that maximum use is made of all of the plow bottoms. While in-furrow hitches that have been used in the past have been generally satisfactory, none of the prior art arrangements have provided an entirely satisfactory means for laterally adjusting the implement relative to the tractor, so that the implement can be utilized with tractors of different size and with tractors having different center to center spacing between the rear wheels thereof.

SUMMARY OF THE INVENTION

The in-furrow hitch of the present invention includes a novel adjusting arrangement whereby the lateral position of the implement relative to the tractor can be adjusted through essentially a universal range. This allows the first plow bottom to be accurately positioned in alignment with the inside of the outer tractor wheel regardless of the type of tractor or the spacing between the tractor wheels. The hitch structure of the present invention may also be adjusted vertically.

DESCRIPTION OF THE DRAWINGS

FIG. 1 is a perspective view of a tillage implement including the hitch mechanism of the present invention;

FIG. 2 is a fragmentary front perspective view taken from one side of the tillage implement, showing the hitch mechanism in a first adjusted position;

FIG. 3 is a fragmentary front perspective view taken from a side of the tillage implement opposite from FIG. 2, and illustrating the hitch mechanism in a second adjusted position;

FIG. 4 is an enlarged side elevational view of the hitch mechanism; and

FIG. 5 is a view taken generally along line 5-5 and showing the steering linkage connected to the steering post.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings in detail, the hitch mechanism of the present invention is illustrated in use with a moldboard plow type of tillage implement 10, it being understood that the hitch mechanism could be used with other types of ground working tools. The hitch mechanism is illustrated generally at 11, and is of the "in-furrow" type, with the hitch mechanism being adapted to be connected to the lower draft links conventionally provided on a tractive vehicle, such as a tractor.

The implement 10 has a frame structure including a box frame member 12 that is disposed at an angle with respect to the direction of movement of the implement 10, as is well known. A longitudinally extending brace member 13 is secured to an intermediate portion of frame member 12, and extends forwardly therefrom. An inclined front frame member 14 is secured between the forwardmost portions of frame members 12 and 13.

The implement 10 includes a subframe structure for mounting a plurality of ground working tools, and the subframe structure includes an inclined frame member 15 secured to the lower portion of frame members 13 and 14, with frame member 15 being generally parallel with frame member 12.

The ground working tools illustrated herein are in the form of moldboard plow bottoms 16, and the plow bottoms may be suspended from the subframe structure by safety trip mechanisms 17, as described in our commonly assigned, concurrently filed application Ser. No. 763,109 entitled "Trip Mechanism For Ground Working Implement." As is described in detail in our above-mentioned application, the plow bottoms 16 are moved to a tripped position in response to engagement with an unyielding obstruction, and hydraulic cylinder assemblies 17a are connected between frame member 15 and the ground working tools for automatically returning them to the normal ground penetrating position.

The hitch mechanism of the present invention includes a transversely extending crossbar 18 having laterally outwardly extending journals 19 at opposite ends thereof for connection with the lower draft links of a tractor. Crossbar 18 is a generally rectangular boxlike member, and a plurality of horizontally spaced openings 20 are provided in the upper and lower walls of crossbar 18, with each opening in the upper wall being aligned with a corresponding opening in the lower wall. Holes 20 cooperate to define a first means for laterally adjusting the implement 10 relative to the tractor, as will hereinafter appear.

A pair of vertically spaced connector plates 21 and 22 sandwich the crossbar 18 therebetween, and connector plates 21 and 22 include openings in the forward corners thereof, which provide means for securing the plates 21 and 22 at selected positions upon crossbar 18. Bolts 23 impale the openings in plates 21 and 22, as well as the openings in crossbar 18, it being understood that the center to center spacing between the holes in plates 21 and 22 are the same as the spacing between selected pairs of openings 20 in crossbar 18. Nuts 24 are threaded upon the lower ends of bolts 23 to positively secure the plates 21 and 22 at selected positions upon the crossbar 18.

An upright steering tube 25 if fixed within aligned openings 27 and 28 in the rearward ends of plates 21 and 22, respectively, with tube 25 also extending upwardly through an opening 26a in a carrier plate 26. Carrier plate 26 is horizontally disposed, and is held against rotation relative to the implement frame by adjustable steering linkage means SL. Steering tube 25 is journaled within a vertically disposed guide sleeve 29, and the lower end of sleeve 29 is secured to the upper surface of plate 26 around the opening 26a by welding or the like. The rearward side of sleeve 29 is secured, as by welding, to a vertically disposed flat mounting plate 30 to define a steering tube assembly or means.

Mounting plate 30 includes vertically spaced rows 31 and 32 of horizontally spaced openings. Rows 31 and 32 provide alternatively selectable means whereby the vertical position of the implement relative to the tractor may be adjusted, as will hereafter appear.

The hitch mechanism 11 also includes means for providing a universal degree of lateral adjustment of the implement relative to the tractor. To this end, a first L-shaped channel 33 is secured to the upper side of frame members 13 and 14 at the forward end thereof, with a second L-shaped channel 38 being secured to the lower side of frame members 13 and 14 at the forward end thereof. Channel member 33 includes a first flat leg 34 that rests upon the upper surfaces of frame member 13 and 14, and channel member 33 also includes a second leg 35 disposed perpendicularly with respect to leg 34 and positioned forwardly of the forward ends of frame members 13 and 14, as can be seen in FIG. 4.

Channel member 38 includes a first leg member 39 positioned in face abutting engagement with the lower surfaces of frame members 13 and 14 at the forward end thereof. Channel member 38 further includes a second leg 40 disposed perpendicularly with respect to leg 39 and extending upwardly toward leg 35 of channel 33. As is evident from FIG. 3, legs 35 and 40 are spaced from the forwardmost end of frame members 13 and 14 to define a horizontally disposed slideway 42 therebehind. The lower end of leg 35 is spaced from the upper end of leg 40 to provide a mouth or entryway 43 to the slideway 42. Channels 33 and 38 are retained in place upon the implement frame by spaced bolts 36 that impale aligned openings in channel legs 34 and 39, and in frame member 14; and by a pair of spaced bolts 37 that extend through aligned openings in channel legs 34 and 39 and in frame member 13. Nuts, such as those illustrated at 36a in FIG. 3, are secured to the lower ends of bolts 36 and 37.

Plate 30 includes selectively positionable means which cooperate with the slideway 42 to define the means providing a universal range of adjustment of the implement 10 relative to the tractor. Said means includes a clamping block 45 having a row of horizontally spaced, internally threaded openings 46. Clamping block 45 is positionable at alternatively selectable vertical elevations on plate 30 by bolts 47 that can be either threadably engaged with the openings 46 in the clamping block 45 and with either the row of openings 31 or the row of openings 32.

As is evident from FIG. 4, clamping block 45 has a larger vertical dimension than the width of mouth 43, so that when the bolts 47 are tightened, block or plate 45 is pulled into snug engagement with the rearwardly facing surfaces of legs 35 and 40. The position of the implement 10 can be adjusted relative to the tractor through a universal range by merely loosening bolts 47 and sliding the hitch mechanism 11 to the right or to the left, as desired, and when the selected position is reached, the hitch mechanism can be secured in place merely by retightening bolts 47.

As is explained in our commonly assigned, concurrently filed application Ser. No. 763,204, now U.S. Pat. No. 3,543,864 entitled "Tail Wheel Lift Mechanism," a tail wheel 50 is secured to the rearward end of the implement frame by a compensating linkage means 51. The tail wheel 50 is steered through the above-described hitch mechanism and a steering linkage means 52 best seen in FIG. 1. The steering linkage means 52 includes a first steering arm 53 that is secured by a bolt 54 and nut 55 to the flattened upper end 56 of steering post 25. Arm 53 is pivotally connected to the forwardmost end of a first steering link 57, and the rearward end of steering link 57 is pivotally connected at 58 to a second steering arm 59 that is mounted upon a pivot post 60 which extends upwardly from frame member 12. The forward end of a second steering link 61 is pivotally connected to the rearward end of first steering link 57 at 58, and the rearward end of second steering link 61 is connected to the end of a third steering arm 62, which is connected to the axle for controlling movement of tail wheel 50. Thus, when the tractor pulling the implement 10 turns, the tail wheel 50 is steered by the cooperative action of the hitch mechanism 11 and the steering linkage means 52.

From the foregoing it will be readily appreciated that the hitch mechanism 11 provides a means whereby the implement 10 can be adjusted and accurately located relative to a tractor. The cooperating openings in plates 21 and 22 and in crossbar 18 may be said to provide a rough lateral adjustment means whereby the implement 10 can be initially positioned relative to the tractor. The clamping plate 45 and groove 43 may be said to provide a fine lateral adjustment means whereby the final position of the implement can be accurately controlled. The adjustment means are extremely simple, and can be adjusted with a minimum expenditure of time and effort to precisely locate the first bottom 16 in alignment with the inside of the outer tractor wheel regardless of the tractor width or the distance between the tractor wheels.

What we claim is:

1. A tillage implement adapted to be connected to a tractive vehicle having spaced ground-engaging wheels and first and second implement support links at the rearward end thereof, said implement comprising:

a frame having a forward end and a rearward end;

a plurality of ground-working tools mounted on said frame between said forward end and said rearward end;

a steerable tail wheel movably mounted at the rearward end of said frame;

linkage means connected to said tail wheel for controlling movement thereof; and hitch means connected to the forward end of said frame, said hitch means including a crossbar having spaced support means for connection to the first and second implement support links, a generally upright steering tube means mounted upon said frame, a steering post within said tube means and connected to said linkage means and to said crossbar, first means for adjusting said steering tube means relative to said crossbar to position said steering tube means at one of a plurality of selectable positions, means on said frame defining a laterally extending groove, means associated with said tube means slidably received in said groove for providing a second universal adjustment means for varying the location of said tube means relative to said frame, and means for securing said tube means at a selected position along said groove, whereby the first ground-working tool carried by said frame can be accurately aligned with the outermost wheel of said tractive vehicle.

2. A tillage implement as set forth in claim 1 wherein said groove-defining means includes vertically spaced members secured to the upper and lower sides of said frame at the forward end thereof, said vertically spaced members including vertically aligned surfaces defining said groove therebehind.

3. A tillage implement as set forth in claim 2 in which the means slidably received in said groove is defined by a plate carried by said tube, said securing means being defined by fasteners connected to said tube means and said plate for drawing said plate into clamping engagement with said vertically aligned surfaces.

4. A tillage implement as set forth in claim 3 including means for vertically adjusting said tube means relative to said frame.

5. A tillage implement as set forth in claim 4 in which said tube means includes a mounting plate having a tube secured thereto, and wherein said vertically adjustable means is defined by at least a pair of vertically spaced rows of openings in said mounting plate adapted to receive said fasteners therethrough.

6. A tillage implement as set forth in claim 1 in which said crossbar has a series of laterally spaced holes therein, and wherein said first adjusting means is defined by a plate supporting said tube means, said plate having openings therein positionable in alignment with the openings in said crossbar, and fasteners impaling said aligned openings.